United States Patent [19]

Ban

[11] 3,849,113

[45] Nov. 19, 1974

[54] PROCESS FOR THE PRODUCTION OF CRUDE FERRONICKEL

[75] Inventor: Thomas E. Ban, South Euclid, Ohio

[73] Assignee: McDowell-Wellman Engineering Company, Cleveland, Ohio

[22] Filed: June 12, 1973

[21] Appl. No.: 369,169

[52] U.S. Cl. .................................................. 75/3
[51] Int. Cl. ............................................ C22b 1/24
[58] Field of Search .................................. 75/3, 82

[56] References Cited
UNITED STATES PATENTS

| | | | |
|---|---|---|---|
| 3,264,091 | 8/1966 | Ban | 75/3 X |
| 3,333,951 | 8/1967 | Ban | 75/3 |
| 3,503,735 | 3/1970 | Beggs et al | 75/82 X |

Primary Examiner—A. B. Curtis
Attorney, Agent, or Firm—McNenny, Farrington, Pearne & Gordon

[57] ABSTRACT

There is provided an improved process for producing crude ferronickel from lateritic ores. The process is carried out by blending finely divided lateritic ore and finely divided carbonaceous material and water to form pellets. The pellets are deposited on a traveling grate, dried by passing hot gases therethrough, and finally heated with hot oxygen-depleted gases at a temperature of from 1,500° to 2,400°F. to effect as nearly complete reduction of the nickel moiety as possible without unnecessarily large amounts of iron to yield a hot pelletized nickel-containing material. This nickel-containing material may be added directly to a smelting furnace wherein, instead of effecting any reduction, only melting occurs in the furnace to blend the nickel with any metallic iron present in the formation of crude ferronickel.

1 Claim, 1 Drawing Figure

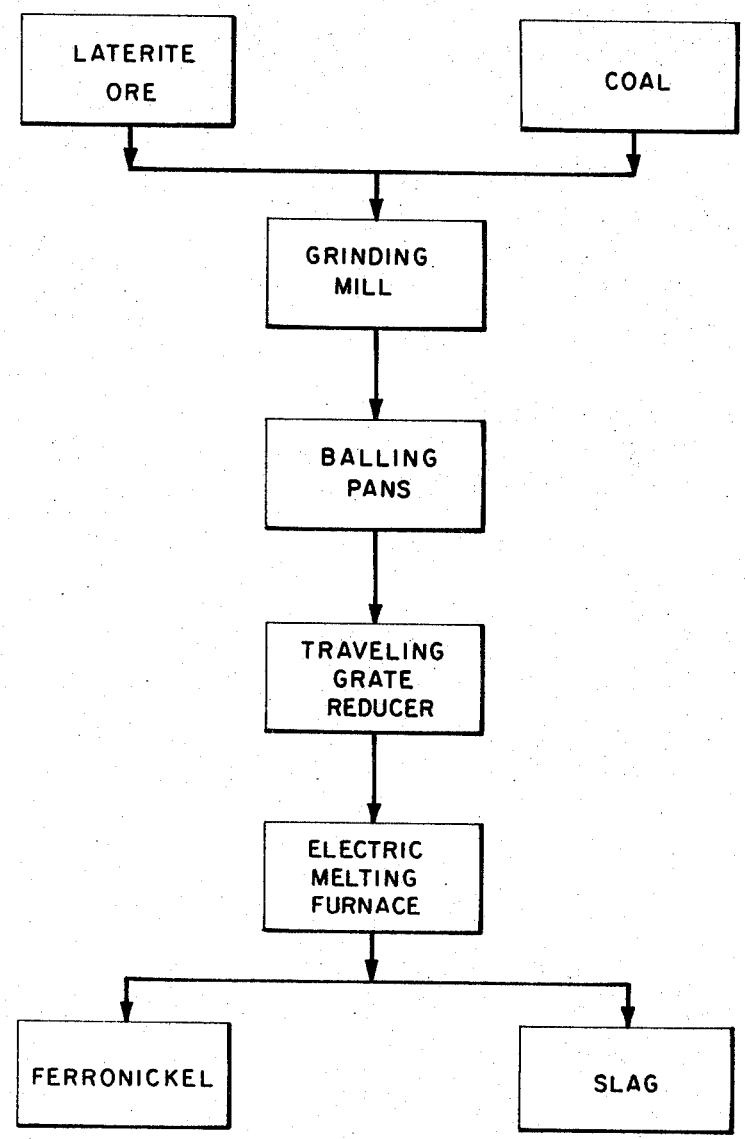

PROCESS FOR THE PRODUCTION OF CRUDE FERRONICKEL

BACKGROUND OF THE INVENTION AND PRIOR ART

Ferronickel is an iron alloy containing from about 20 to about 35 percent nickel, and the balance iron, plus small amounts of impurities. Ferronickel is an ingredient used in the production of nickel cast iron and in the production of stainless steel.

The conventional electrothermal ferronickel process as practiced in New Caledonia involves a stage of preheating the lateritic ore for removal of volatile constituents such as free water and water or recrystallization. The warm ore from calcining is then proportioned with the small amounts of coke added in a specific ratio for reduction of all the nickel oxide and some of the iron oxides. Control is exercised to prevent overreduction of the iron oxide and to bring about complete reduction of the nickel to produce ferronickel metal which is high in nickel content (relatively speaking, i.e., >20 percent) and low in iron content (i.e., <80 percent). Such a material is favored as high grade ferronickel alloy. The charge for the conventional process is comprised of relatively coarse individual particles of coke and ferronickel ore (laterite) which are caused to co-react within the crucible of an electric smelting furnace. Such conditions of smelting do not afford good opportunity for making low iron ferronickel at relatively low costs. Larger than desired quantities of reductant material such as coke are purposefully added to bring about the complete reduction of nickel from the coarse particles. Coincidentally, this quantity of carbon reduces more than desired amounts of iron oxide to metallic iron. Also, the charge generally is not completely preheated or prereduced to a significant level. Thus, a substantial quantity of electrothermal energy is required to bring about smelting for the final reduction reactions. A preferred system for producing ferronickel would call for the use of relatively small amounts of electrical energy and produce a metal with a minimum amount of iron contained therein.

Reference Patent be had to the U.S. Pat. to Udy 2,953,451 which is typical of a prior art procedure for producing ferronickel. melted constituents It has now been discovered that selective reduction can be practiced on a lateritic nickel-containing ore outside of the electrothermal process in an electric arc smelting furnace by reacting a composite charge in a pellet form. The composite charge in accordance with this invention consists of controlled quantities of said carbonaceous material finely ground and intermixed with finely ground nickel ore such as laterite. As the solid carbonaceous material, there may be used coke, coke breeze, anthracite, or bituminous coal. Naturally occurring carbon sources are preferred. It has been found that complete reduction of nickel oxide can be attained with a relatively smaller partial reduction of the iron oxide. Thus, after such treatment, the composite pellet need only be melte in order to separate the metallic phase comprised of nickel and iron from the slag phase containing the gangue constitutents and a substantial percentage of unreduced iron oxide. The novelty of the new process is in the preparation of a completely prereduced pellet for introduction into a melting furnace whereby electric current is supplied only for the purpose of melting the preformed metal to separate it from the gauge constituents rather than also providing energy for the endothermal reaction otherwise normally accomplished in an electric furnace. The heat input with the improved process is effected with cheap fuel and coal instead of electricity. These differences are in distinction to the conventional systems which simply calcine and smelt the lateritic ore to ferronickel with a deficiency of carbon to prevent excessive reduction of the iron. See Udy supra.

BRIEF STATEMENT OF THE INVENTION

Briefly stated, therefore, the present invention is in a process for producing crude ferronickel from lateritic ore comprising the steps of forming moist pellets consisting essentially of from 10 percent to 18 percent water, finely divided lateritic ore, and finely divided coal, the amount of coal being in slight excess over that stoichiometrically required to reduce the nickeliferous moiety of the ore to nickel. Thereafter, the moist pellets are charged to a traveling grate machine, to a depth of from 6 to 12 inches. The pellets are then dried by passing hot oxygen-depleted gas at a temperature of from 400° – 800°F. through the bed at a rate of about 250 – 400 standard cubic feet per minute per square foot of grate area (hereinafter referred to as SCFM/sq. ft.) for a period of time sufficient to reduce the moisture content to no more than about 3 percent by weight of water. The drying gas may be recycled from the firing zone. Thereafter, the dried pellets are fired with hot oxygen-depleted gas to induce a temperature of from 1,500° to 2,400°F in the pellets for a period of from 15 to 40 minutes, such gas being passed through the burden at a rate of from 100 to 250 SCFM/Sq. ft. of grate area. The process yields hot pellets in which at least 95 percent of the nickel is reduced to metal.

BRIEF DESCRIPTION OF THE DRAWING

The invention may be better understood by having reference to the annexed drawing which is a flow sheet showing a preferred embodiment of the present invention.

DETAILED DESCRIPTION OF THE INVENTION

Basically, the process consists of grinding and blending a lateritic nickel-containing ore and coal so that the particle size of all of the material is less than 10 mesh. This material is submitted to a conventional balling operation in a balling pan such as that shown in U.S. Pat. No. 3,169,269. The resulting moist pellets are sized so as to be in the range of from 0.375 to 0.75 inch in diameter and charged to a traveling grate machine of any known structure, see for example U.S. Pat. No. 3,302,936.

Here, the pellets in a quiescent although slowly traveling bed (1 to 2 ft/min.) are first submitted to hot gases at temperatures in the range of from 400° to 800°F. for the purpose of drying the pellets. Thereafter, the pellets enter a firing zone where, with the aid of torches and generally nonoxidizing gases (less than about 5 percent $O_2$ by volume), the burden is treated so as to raise the temperature to near the melting point of the pellets without undergoing melting, i.e., in the temperature range of from 1,500° to 2,400°F. Although ambient air is used in the firing zone prior to the gas torches, with the local burning of volatiles from the coal, the gas as it enters the burden is neutral or reducing and contains less than 5 percent by volume of oxygen. This is what is meant by the term oxygen-depleted. Recycle gas from the firing zone is gas that has traversed the burden at least once and is also neutral or reducing, i.e., oxygen-depleted. Such recycle gas is conveniently used in the drying zone. Temperatures of 1,500° – 2,400°F. cause the finely divided carbon to react with the finely divided nickeliferous moiety in the finely divided ore and to reduce preferentially the nickel ore to metallic nickel. The reduction of nickel oxide to nickel metal proceeds much more rapidly than does the reduction of iron oxide to metallic iron. Although some iron is reduced to the metal in accordance with this process, a lesser proportion of iron is so formed than presently available in the conventional currently practiced procedures for making ferronickel. This, of course, effects considerable savings in ultimate transportation costs, for example.

When the fired pellets are discharged from the traveling grate machine, they may be conducted directly into an electric arc furnace at which point the temperature is increased to a point sufficient to fuse the pellets and effect a separation of the metallic constituents from the slag or gangue materials. The resulting ferronickel material may be recovered from the electric furnace and cooled for subsequent use at a remote point. The electric furnace may contain cast iron forming materials from a different source whereupon nickel-containing cast iron may be produced directly.

Table I below gives a typical analysis of lateritic ore and a ferronickel produced therefrom:

TABLE I

GENERAL ANALYSIS LATERITE ORE AND FERRONICKEL

| Raw Materials | Laterite Ore Silicate (Garnierite) | |
|---|---|---|
| | % Dry Basis | % Dry Basis |
| Ni + Co | 2.3 | 2.9 as NiO |
| Fe | 18.5 | 26.5 as $Fe_2O_3$ |
| Cr | 1.2 | 1.7 as $Cr_2O_3$ |
| MgO | 15.0 | 15.0 |
| $SiO_2$ | 35.0 | 35.0 |
| $Al_2O_3$ | 4.5 | 4.5 |
| CaO | 0.1 | 0.1 |
| LOI | 11.5 | 11.5 |
| Unacct. | | 2.8 |
| | | 100.0 |
| $H_2O$ | | 30% |
| Reduction | | |
| Type of Reduction | | Selective |
| Products | | |
| Grade of Product | | % |
| Ni | | 33.0 |
| Fe | | 67.0 |
| Si | | — |
| Cr | | — |
| C | | — |
| S | | high |
| | | 100.0 minus residuals |

Pounds metal/NT dry ore at 100% Ni recovery - 138 pounds

Table II sets forth the general processing requirements in accordance with the present invention for the production of 33.3 percent ferronickel in a large scale system.

TABLE II

SILICATE (GARNIERITE) NICKEL BEARING ORE GENERAL PROCESSING REQUIREMENTS

General Basis:
1. Production of 33.3% ferronickel (138 pounds) in large scale system

| Raw Materials | | Estimated Requirement Per Net Ton of Dry Ore |
|---|---|---|
| Ore | | 2860 lbs. |
| Coal | | 115 lbs. |
| Fuel Oil | | 4 MMBTU |
| Electrical Energy - | Melting | 240 kwhr |
| | Auxiliary | 40 kwhr |

In a specific example, 2,000 lbs. of lateritic ore (natural basis) having a composition as provided in Table I above is blended with 80 lbs. of anthracite coal containing 85 percent fixed carbon. This mixture is ground in a rod mill to a fineness of approximately 100 percent minus 20 mesh. This blend is balled with approximately 18 percent water to –¾ inch plus ⅜ inch size pellets. This terminology means that the pellets pass through a ¾ inch opening screen, but are retained on a ⅜ inch opening screen. These pellets are then subjected to treatment on a traveling grate machine in accordance with the following schedule:

| | |
|---|---|
| Bed Depth | 6 – 12 in. |
| Drying cycle gas flow | 250 – 400 SCFM/sq. ft. |
| Time | 6 – 10 min. |
| Temperature | 400 – 800°F. |
| Reducing cycle draft flow | 100 – 200 SCFM/sq. ft. |
| Time | 15 – 40 min. |
| Temperature | 1500 – 2400°F. |

The hot reduced pellets are then charged to an electric melting furnace and converted to liquid metal and slag which are separated in accordance with known procedures. The metallic moiety forms a "button" of ferronickel weighing 138 lbs.

What is claimed is:

1. A process for producing crude ferronickel from lateritic ore comprising:
   1. forming moist pellets ⅜ inch to ¾ inch in diameter and consisting of uniformly blended finely divided lateritic ore and finely divided solid carbonaceous fuel, the amount of said fuel being only slightly more than stoichiometrically required to reduce the nickeliferous moiety of the ore;
   2. charging moist pellets to a traveling grate to a bed depth of from 6 – 12 inches;
   3. drying said pellets by passing hot oxygen-depleted gas at 400° – 800°F through the bed at a rate of 250 – 400 SCFM/sq. ft. of grate area for a period of time sufficient to reduce the moisture content to no more than about 3 percent by weight;
   4. firing said dried pellets with hot oxygen-depleted gas at 1,500° – 2,400°F for 15 – 40 minutes at a rate of 100 – 250 SCFM/sq. ft. of grate area to yield hot oxide-containing pellets in which at least 95 percent of the Ni is reduced to metal;
   5. charging the hot pellets to an electric arc furnace to separate the metal from the oxide constituents.

* * * * *